Nov. 5, 1935.                  W. OCHEL                  2,019,723
REGULATING DEVICE
Filed March 17, 1934            3 Sheets-Sheet 1

INVENTOR.
WILLY OCHEL
BY
ATTORNEYS.

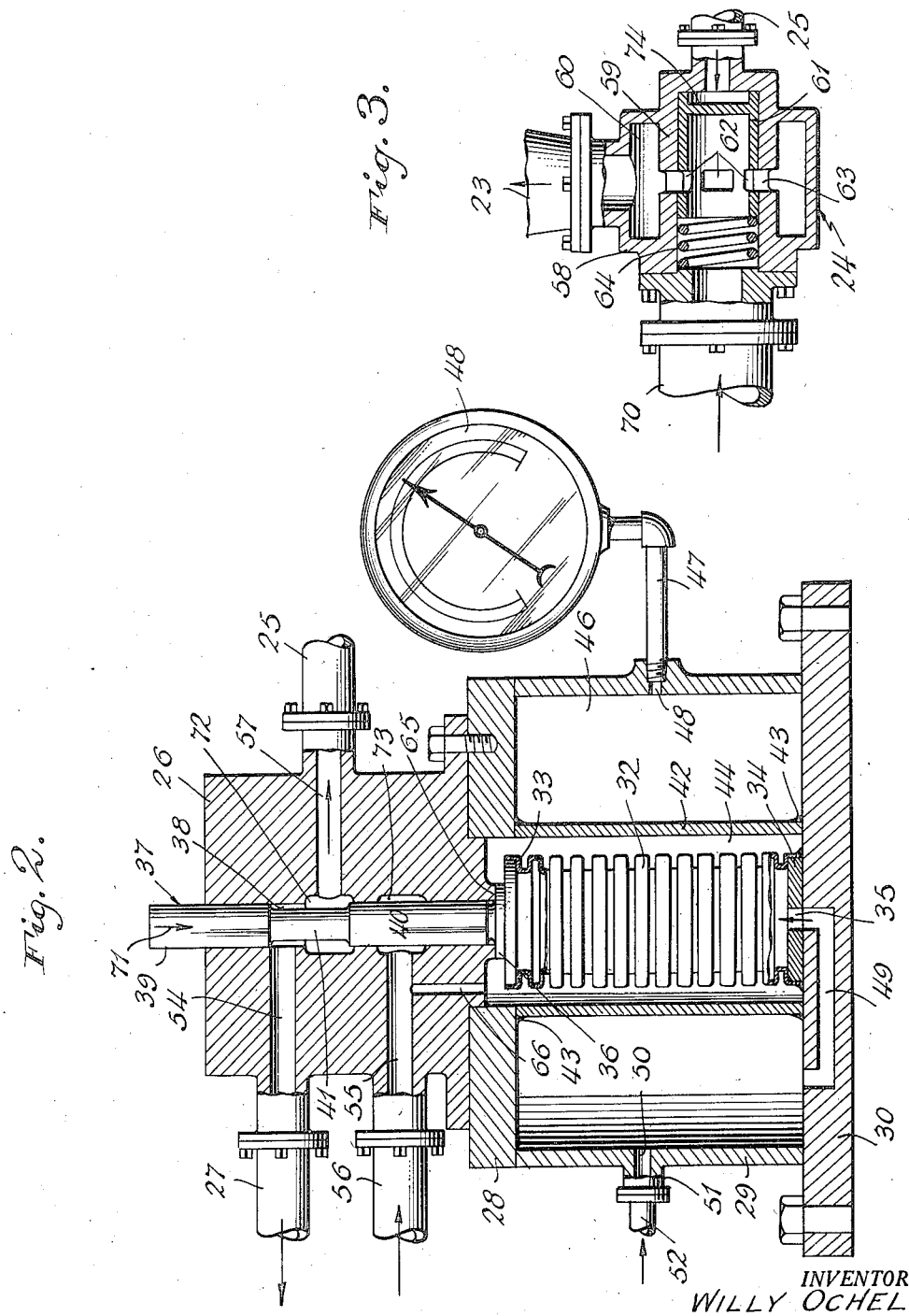

Nov. 5, 1935.     W. OCHEL     2,019,723
REGULATING DEVICE
Filed March 17, 1934     3 Sheets-Sheet 3

INVENTOR.
WILLY OCHEL
BY Richards & Geier
ATTORNEYS.

Patented Nov. 5, 1935

2,019,723

UNITED STATES PATENT OFFICE 2,019,723

REGULATING DEVICE

Willy Ochel, Berlin-Wittenau, Germany, assignor to A. Borsig Maschinenbau, A. G., Berlin-Tegal, Germany, a corporation of Germany Application March 17, 1934, Serial No. 716,143
In Germany November 25, 1933

9 Claims. (Cl. 230—31)

This invention relates to regulating devices and refers more particularly to devices which may be used for regulating the output of different types of machines, for instance, the amount of air supplied to an air compressor, in conformity with the pressure of compressed air or other medium delivered by the machine.

Regulators known in prior art comprise a regulating piston, the lower surface of which is in contact with the compressed medium, while a weight is placed on the upper surface of the piston.

These regulators are inaccurate since they do not respond readily to small differences in pressure in view of the inertia of the weight and the large frictional forces developed by the piston.

Diaphragms used for regulating purposes in prior art have a short stroke and are not suitable for high pressures.

Electrical devices have also been employed to obtain a fine regulation of the output. Such devices break easily due to the disintegrating effect of the compressed medium upon electrical contacts and are suitable only for factories having a sufficient supply of electrical energy.

An object of the present invention is the provision of a mechanical regulating device which operates practically without any losses caused by friction or inertia and which has a large regulating stroke.

A further object is the provision of a regulating device, which is readily responsive to very small differences in pressure.

The above and other objects of the present invention may be realized through the provision of an expansible and contractible member, such as a cylindrical bellows diaphragm, which is under the influence of two pressures; one of them is the constant pressure of an auxiliary gas, while the other pressure is that of the medium delivered by a machine, for instance air compressed by a compressor. If the pressure of the compressed air is increased, the diaphragm contacts and actuates a device used, for instance, for varying the amount of the air supplied to the compressor.

In accordance with the present invention, the expansible and contractible member may consist of two separate interconnected bellows one of which is subjected to the pressure of the medium delivered by a compressor, while the other bellows is under the constant pressure of the auxiliary fluid.

The invention will appear more clearly from the following detailed description when taken in connection with the accompanying drawings showing preferred embodiments of the inventive idea.

In the drawings:

Figure 2 is a vertical section through the regulating device shown in Figure 1.

Figure 3 is a vertical section through a valve shown in side elevation in Figure 1.

Figure 1:
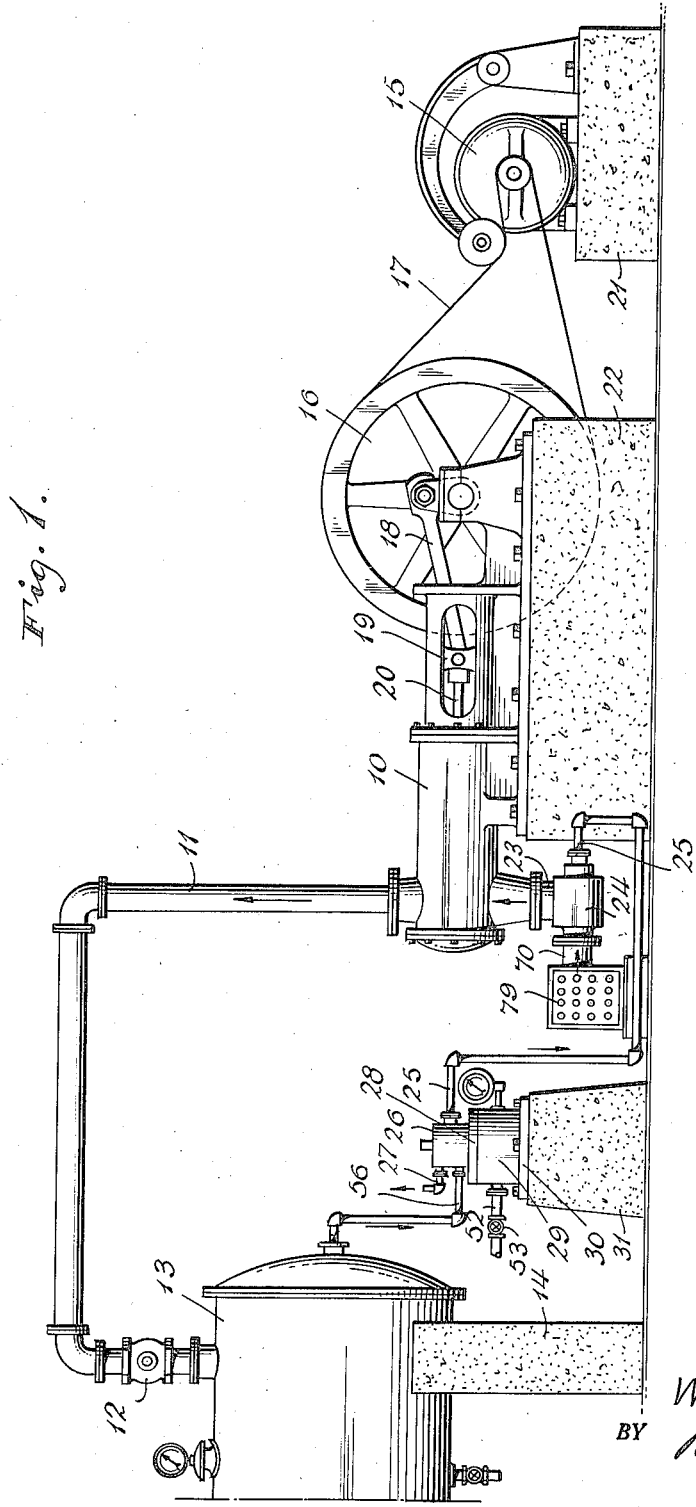
Figure 1 shows diagrammatically an air compressor provided with a device regulating the amount of air supplied to the compressor.

The regulating device illustrated in Figures 2 and 3 of the drawings, is shown in Figure 1 in its application to a compressor used for compressing air. It is obvious, however, that the same device may be used for regulating the output of other engines and machines.

The compressor 10 shown in Figure 1 is connected by a pipe 11 provided with a check valve 12, with an air tank 13, carried by the support 14.

The compressor 10 is driven by a motor 15 which drives a fly wheel 16 by means of the belt transmission 17. The fly wheel 16 is connected with a rod 18, which drives the crosshead 19 connected with the piston rod 20 of the compressor 10. The motor 15 is carried by the support 21, while the compressor 10 and the fly wheel 16 are carried by the support 22.

Air is supplied to the compressor 10 through the pipe 23, which is connected with a valve 24 shown on a larger scale in Figure 3.

One end of the valve 24 is connected by the pipe 70 with an air filter 79. The opposite end of the valve 24 is connected with a pipe 25 leading to the casing 26. As shown in Figure 1, a pipe 27 attached to the casing 26 is provided with an open end. The casing 26 is carried by a plate 28, which serves as a cover for the cylinder 29. The cylinder 29 is placed on top of a supporting plate 30, which is carried by the support 31.

The regulating device shown on a larger scale in Figure 2, comprises a cylindrical bellows diaphragm 32, the upper end of which carries a plate 33 connected with the bellows by soldering or the like. The lower end of the bellows 32 is soldered to the plate 34, which is provided with an opening 35. The plate 34 is welded to the supporting plate 30.

The plate 33 is rigidly connected with a plate 36, which is made of a single piece with a distributing piston 37. The piston 37 is situated within a vertical bore hole 38 formed in the casing 26 and comprises an upper cylindrical portion 39, a lower cylindrical portion 40 having substantially the same diameter as the portion 39, and an intermediate portion 41, which has a smaller diameter than the portions 39 and 40. The bore hole 38 is connected with chambers 72 and 73 which are formed in the casing 26 and have a larger diameter than the bore hole 38.

The bellows 32 is surrounded by a tubular casing 42, which is carried by the plate 30 and which is provided with a weld or seal 43 preventing air from penetrating into the chamber 44 formed by the bellows 32 and the walls of the casing 42. An annular chamber 46 is formed between the walls of the casing 42 and the cylinder 29.

A narrow elongated tube 47 is screwed into an opening 48 formed in the casing 29 and carries a manometer or pressure-gauge 48.

A channel 49 is formed in the plate 30 and is used for interconnecting the annular chamber 46 with the interior of the bellows 32. The opening 35 provided in the plate 34 forms a continuation of the channel 49.

Another opening 50 formed in the cylinder 29 is surrounded by a flange 51 connected with a pipe 52. The pipe 52 leads to a container which is filled with a gas having a predetermined constant pressure and which is not shown in the drawings. As shown in Figure 1, the pipe 52 carries a valve 53 by means of which the supply of gas to the chamber 46 may be interrupted at will.

The casing 26 is provided with a channel 54 which communicates with the interior of the pipe 27. The opposite end of the pipe 27 is open, as shown in Figure 1. The channel 54 connects the pipe 27 with the bore hole 38.

Another channel 55 situated below the channel 54 connects the chamber 73 with a pipe 56. As shown in Figure 1, the pipe 56 leads to the air tank 13. A channel 66 formed in the casing 26 (Fig. 2) connects the channel 55 with the chamber 44.

The chamber 72 connected with the bore hole 38 is also connected with a channel 57, which is in communication with the interior of the pipe 25.

As shown in Figures 1 and 3, the pipe 25 is connected with the valve 24. The valve 24 comprises an outer casing 58 (Figure 3) connected with the pipe 23 and an inner casing 59 connected with the pipe 25. An annular chamber 60 is formed by the walls of the casings 58 and 59. A movable piston 61 having a bottom 74 is situated within the casing 59 and is provided with a plurality of openings 62, which are similar to openings 63 formed in the casing 59. A spring 64 which presses against the piston 61 is situated within the casing 59.

To operate the regulating device, the operator must first switch on the valve 53 carried by the pipe 52. Then the annular chamber 46 surrounded by the cylinder 29 will be filled with a gas supplied under a constant predetermined pressure from a container which is connected with the pipe 52.

The annular chamber 46 is filled with gas until the manometer 48 shows that the pressure within the chamber 46 has reached a certain predetermined amount. Then the valve 53 is switched off and the supply of gas to the chamber 46 is interrupted.

The amount of gas supplied to the chamber 46 and its pressure depend upon various local conditions and can be easily determined by the operator.

The gas filling the chamber 46 passes through the channel 49 and the opening 35 into the interior of the bellows 32 and presses the plate 36 against the flange 65 forming a part of the casing 26.

Compressed air stored within the air tank 13 flows through the pipe 56, which leads to the channel 55. Since the channel 55 is in direct communication with the chamber 44 by means of the channel 66, the air from the air tank 13 will fill the chamber 44 and will press the bellows 32 from the outside tending to contract it while the gas supplied to the interior of the bellows through the pipe 52 tends to expand the bellows 32.

By regulating the pressure of the gas within the chamber 46, it is possible to balance the two pressures to such an extent that when the pressure in the air tank 13 has a certain value the plate 36 will touch the flange 65. This position is shown in Figure 2 of the drawings.

In this position, air will be supplied to the compressor 10 through the air filter 79 and the pipe 70. This air will flow into the interior of the piston 61 within the valve 24 and will pass through the openings 62 and 63 into the pipe 23 which is connected with the compressor, as shown in Figure 1.

The device operates automatically as soon as the pressure within the air tank 13 is increased above a certain predetermined amount. If the pressure in the air tank becomes higher than this amount, the air supplied under pressure through the pipe 56 and the channels 55 and 66 to the chamber 44 will press with a greater force upon the bellows 32 than the gas situated within the bellows 32.

Since in that case the pressure acting upon the upper surface of the plate 33 will be greater than the pressure acting upon the lower surface of that plate, this plate will move downwards and the bellows 32 will be contracted.

Since the piston 37 is connected with the plate 33, this piston will move downward in the direction shown by the arrow 71 (Figure 2) with the result that the middle portion 41 of the piston 37 will be situated between the chambers 72 and 73. Then the channel 55 will be connected with the channel 57, so that the air from the air tank 13 will pass through the pipe 56, the channel 55, the chamber 73, the bore 38, the chamber 72, the channel 57, the pipe 25 and will press against the bottom 74 of the piston 61.

The compressed air from the air tank 13 will move the piston 61, compressing the spring 64, with the result that the openings 62 of the piston 61 will not coincide any more with the openings 63 of the inner casing 59. Then atmospheric air flowing through the air filter 79 and the pipe 70 will not reach any more the chamber 60 and the pipe 23 with the result that no air will be supplied to the compressor 10 and the latter will run without performing any work.

Since the compressor will stop supplying compressed air to the air tank 13, the pressure within the air tank will eventually decrease with the result that the pressure within the bellows 32 will prevail over the pressure within the chamber 44 so that the bellows 32 will return to the position shown in Figure 2.

In this device, the bellows is operated merely by the difference between the external pressure and the internal pressure. An important advantage of this construction is that frictional forces, inertia and resiliency of the tube do not affect the operation of the bellows with the result that the bellows will respond even to very small differences in pressure.

The chamber 46 is used to a certain extent for equalizing the pressure to prevent an undesirable high increase thereof within the bellows during the compression of the latter.

Figure 4:
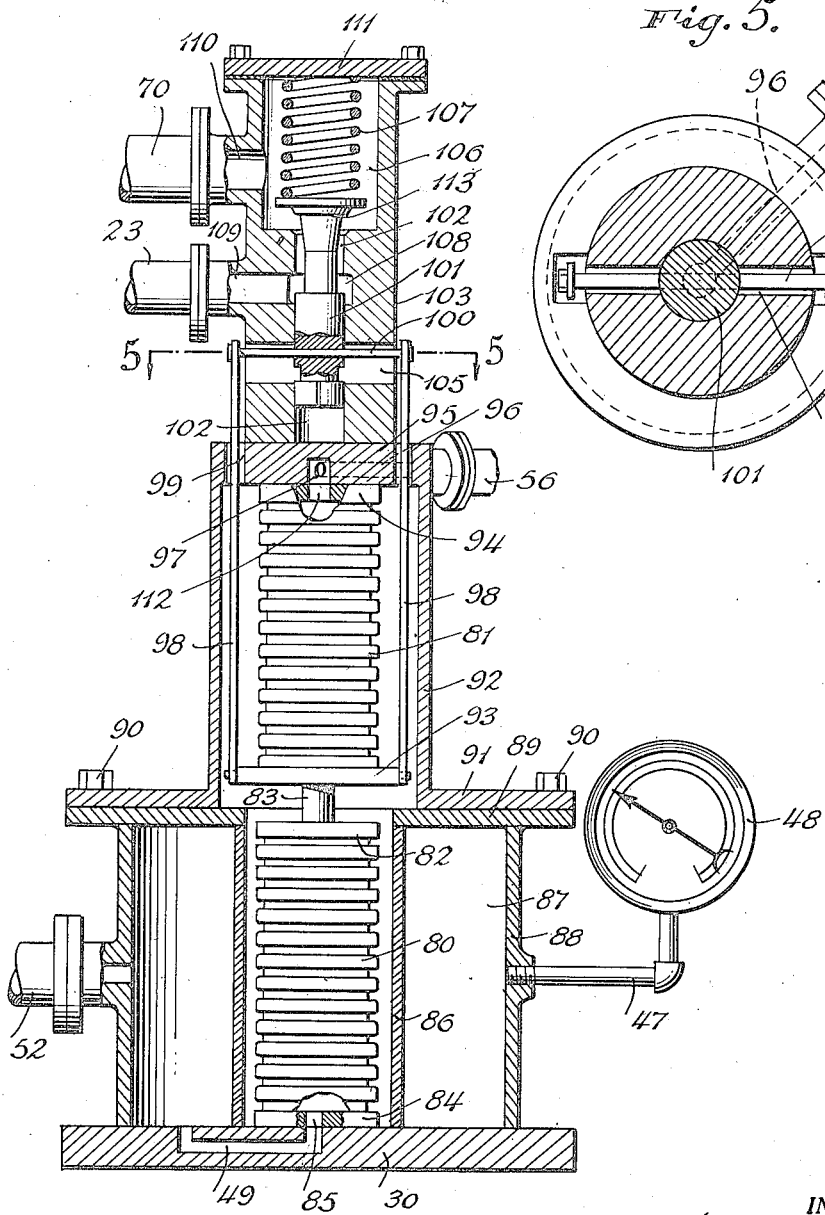
Figure 4 shows in section a regulating device of a somewhat different form.
Figure 5:
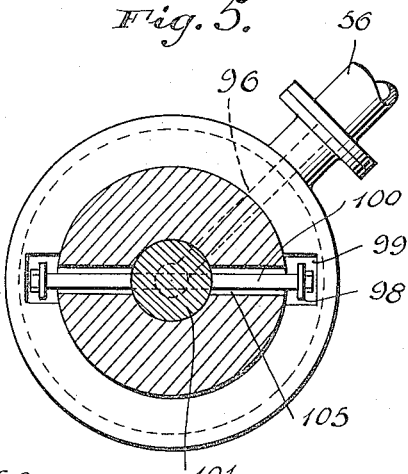
Figure 5 is a section along the line 5—5 of Figure 4.

The device shown in Figures 4 and 5 of the drawings, comprises two bellows 80 and 81. The bellows 80 is connected with an upper plate 82, which is attached to a connecting piece 83. The bellows 80 is also connected with a lower plate 84 which is firmly connected with the supporting plate 30, similar to that shown in Figure 2. The plate 30 is provided with the channel 49 leading to an opening 85 formed in the plate 84.

The bellows 80 is surrounded by an inner tubular casing 86. An annular chamber 87 is formed between the inner tubular casing 86 and an outer tubular casing 88. The pipe 47 carrying the manometer 48 is attached to the casing 88. The pipe 52 leading to a container filled with a gas under a constant pressure is attached to the casing 88.

The tubular casings 86 and 88 are covered by a plate 89 which is connected by screws 90 with the flange 91 of a tubular casing 92.

The bellows 81 is firmly connected with a lower plate 93, which carries the connecting piece 83. The upper plate 94 of the bellows 81 is firmly connected with a plate 95 forming a cover for the tubular casing 92. The plate 95 and the casing 92 may be made of one piece.

A channel 96 shown by broken lines in Figure 4, is in communication with a chamber 97 formed in the plate 95. The opposite end of the channel 96 leads to the pipe 56 which is connected with the air tank 13.

The plate 93 carries a number of connecting rods 98 which pass through suitable openings 99 formed in the plate 95. The rods 98 are interconnected by one or more rods 100, which pass through a suitable opening formed in an auxiliary piston 101 situated within a bore hole 102 formed in the casing 103.

The casing 103 is carried by the plate 95 and comprises a hollow portion 105. The rod 100 is situated within the chamber 105 and is able to move therein along with the piston 101. The bore hole 102 leads into a chamber 106 containing the spring 107. A chamber 108 having a larger diameter than the bore hole 102 is connected with this bore hole and is also in communication with a channel 109 leading to the interior of the pipe 23.

The chamber 106 is connected with the channel 110 leading to the pipe 70, the opposite end of which is connected with the air filter 79. A cover 111 is situated on top of the casing 103. The cover 111 and the adjacent walls of the casing 103 are air tight so that air can penetrate into the chamber 106 only through the pipe 70.

In the position shown in Figure 4, the gas, which is supplied under constant pressure through the pipe 52, penetrates through the channel 49 and the opening 85 into the interior of the bellows 80. At the same time compressed air in the air tank 13 passes through the pipe 56, the channel 96, the chamber 97 and an opening 112 formed in the plate 94 into the interior of the bellows 81.

When the air in the tank 13 has the desired pressure, the device will be maintained in equilibrium in the position shown in Figure 4. Then the valve carried by the pipe 52 is turned off so that a further supply of gas to the interior of the bellows 80 is interrupted.

If the pressure in the air tank 13 becomes too high, the pressure within the bellows 81 will be greater than the pressure within the bellows 80, since the bellows 81 is supplied with air from the air tank 13. Then the bellows 81 will expand, while the bellows 80 will contract with the result that the plate 93 will move downward (looking in the direction of Figure 4). The rods 98 and 100 and the piston 101 will move downward along with the plate 93 until the stopper 113 forming a part of the piston 101 will fill the opening 102 entirely and thus interrupt the connection between the chamber 106 and the chamber 108.

Since the pipe 70 communicating with the chamber 106 leads to the air filter 79, while the pipe 23 communicating with the chamber 108 leads to the compressor 10, the stopper 113 by filling the bore hole 102 will interrupt the supply of air to the compressor 10, so that the compressor will run empty and not supply any more air to the air tank 13.

As soon as the pressure within the air tank 13 has dropped to the desired level, the bellows 80 will expand and the bellows 81 will contract so that the piston 101 will move upwards and back into the position shown in Figure 4.

In this position, the compressor 10 is constantly supplied with fresh air through the filter 79, the pipe 70, the channel 110, the chamber 106, the bore hole 102, the chamber 108, the channel 109 and the pipe 23.

In this device, no pressure from the outside is applied to the two bellows, but each of the bellows is subjected only to inner pressure. This is particularly advantageous since thus the frictional forces are reduced to a minimum.

What is claimed is:

1. In combination with a storage tank and a compressor connected with said tank and supplying a fluid having a variable pressure thereto; a cylindrical bellows, means maintaining the interior of said bellows under a constant pressure, a casing surrounding said bellows, means connecting said tank with the interior of said casing, means supplying a fluid to said compressor, and a regulating member connected with said bellows and in contact with the last-mentioned means, said member being adapted to interrupt the supply of the fluid to said compressor upon increase of pressure of said fluid.

2. A regulating device, comprising a pair of bellows, means interconnecting adjacent surfaces of said bellows, means supplying a fluid having a constant pressure to the interior of one of said bellows, means supplying a fluid having a variable pressure to the interior of the other bellows, a conduit for the second-mentioned fluid, and means connected with the first-mentioned means and adapted to close said conduit upon expansion of the last-mentioned bellows.

3. In combination, a pair of bellows, means supplying a fluid having a constant pressure to the interior of one of said bellows, a plate connected with the other bellows and movable therewith, means connecting said plate with the first-mentioned bellows, a conduit, a stopper adapted to close said conduit, means connecting said stopper with said plate, and means supplying a fluid having a variable pressure to the interior of the second-mentioned bellows, the variable pressure causing a contraction and expansion of the second-mentioned bellows, whereby said stopper is moved to open and close said conduit.

4. In combination, a cylindrical bellows, means supplying a fluid having a constant pressure to said bellows, another cylindrical bellows, means supplying a fluid having a variable pressure to the second-mentioned bellows, means interconnecting said bellows, a conduit, and means connected with the third-mentioned means for closing said conduit, the last-mentioned means being operable upon variations of pressure within one of said bellows.

5. The combination with a compressor; of means for supplying a fluid of predetermined pressure, means for supplying a fluid of variable pressure, a pressure controlled element disposed intermediate and in operative relation with said means for supplying a fluid of predetermined pressure and said means for supplying a fluid of variable pressure, and means connected with said element for regulating the flow of the fluid to said compressor.

6. The combination with a compressor; of means for supplying a fluid of predetermined pressure, means for supplying a fluid of variable pressure, a bellows member disposed intermediate and in operative relation with said means for supplying a fluid of predetermined pressure and said means for supplying a fluid of variable pressure, and means connected with said compressor for regulating the flow of the fluid to said compressor.

7. The combination with a compressor; of means for supplying a fluid of predetermined pressure, means for supplying a fluid of variable pressure, a bellows member, the interior of said bellows member being operatively connected with said means for supplying a fluid of predetermined pressure and the exterior of said bellows member being operatively connected with said means for supplying a fluid of variable pressure, and means connected with said bellows member for regulating the flow of fluid to said compressor.

8. The combination with a compressor; of means for supplying a fluid of variable pressure connected with said compressor, means for supplying a fluid of predetermined pressure, a pressure controlled element disposed intermediate and in operative relation with said means for supplying a fluid of variable pressure and said means for supplying a fluid of predetermined pressure and means connected with said element for regulating the flow of fluid to said compressor.

9. The combination with a compressor; of means for supplying a fluid of predetermined pressure and means for supplying a fluid of variable pressure, a cylindrical expansible and contractible bellows, a hollow casing surrounding the said bellows, another casing connected with the first-mentioned casing and having a channel connected with the interior of the first-mentioned casing, said channel being adapted to transmit the compressed fluid having a variable pressure to the interior of the first mentioned casing, a third hollow casing surrounding the first-mentioned casing, means for connecting the interior of the third mentioned casing with the interior of said bellows, means connecting with the third mentioned casing for supplying the fluid of predetermined pressure thereto, a piston connected and movable along with said bellows and situated in a bore hole in the second-mentioned casing, and regulating means connected with another channel formed in the second mentioned casing and connected with said bore hole, said regulating means being adapted to interrupt the supply of fluid to the first-mentioned means, said piston being adapted to interconnect the two channels formed in the second-mentioned casing upon contraction of said bellows; whereby the compressed fluid operates the regulating means to interrupt the supply of fluid to the first-mentioned means.

WILLY OCHEL.